June 15, 1926.
C. S. GERBER
ELECTRIC CONDENSER
Filed April 1, 1925
1,588,671
FIG. I.
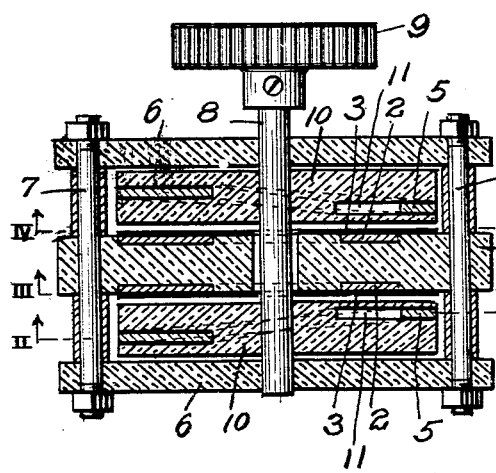
FIG. III.
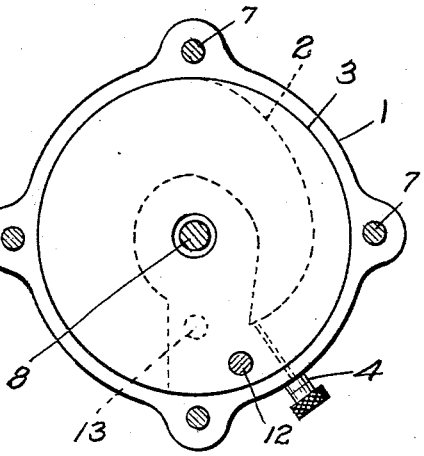
FIG. II.
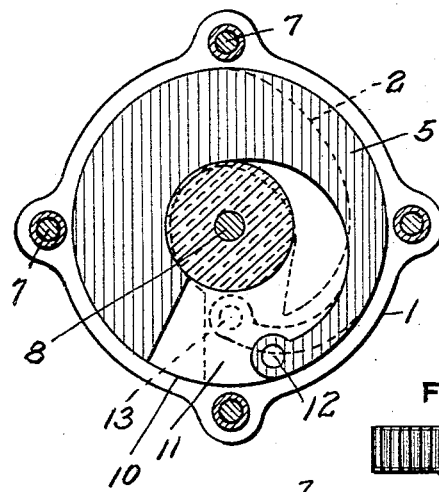
FIG. IV.
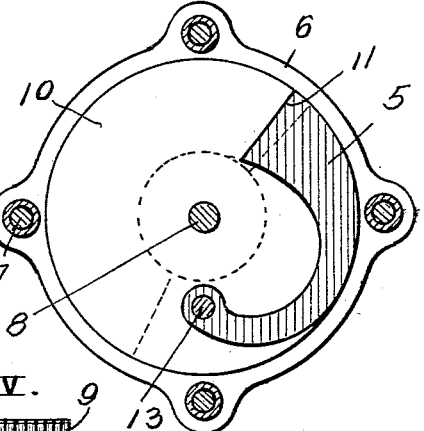
FIG. V.
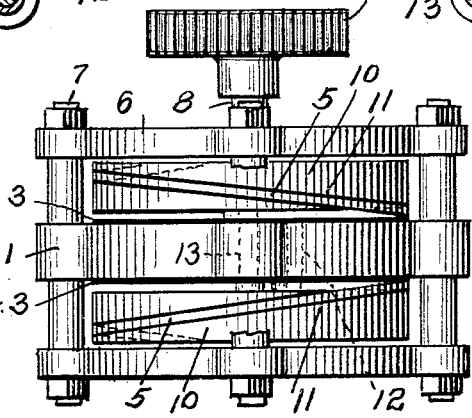
WITNESSES
J. Herbert Bradley
Percy A. English
INVENTOR
Carl S. Gerber,
by Christy & Christy
Attys.

Patented June 15, 1926.

1,588,671

UNITED STATES PATENT OFFICE.

CARL S. GERBER, OF PITTSBURGH, PENNSYLVANIA.

ELECTRIC CONDENSER.

Application filed April 1, 1925. Serial No. 19,762.

My invention relates to electric condensers, and consists in a variable condenser of simple structure, great durability, and capable of a wide range of service. It is applicable generally, but I have developed it as a condenser for service in a domestic receiving set of a wireless telephony system, and in such development I shall, by way of example, show and describe it.
In the drawings Fig. I is a view in vertical and medial section of a condenser embodying my invention; Figs. II, III, and IV, are views in transverse section, on the planes respectively indicated in Fig. I by the lines II—II, III—III, and IV—IV. Fig. V is a view in side elevation.

Block 1 is a block of dielectric, of bakelite or of other suitable material, in this instance of substantially cylindrical form, bearing in its head, and as here shown in both heads, plates 2 of conducting material, of aluminum, for example. These plates are overlain by thin sheets 3 of suitable dielectric, ordinarily mica. The plates 2 are of strip form, and in this instance are incompletely annular, concentrically laid upon the cylindrical block 1; they taper from end to end, and assume therefore the general spiral form clearly shown in Fig. III. Through the block 1 laterally, and from the narrow ends of the plates 2, extend electric leads which terminate in binding-posts 4.

Two plates 5 are provided, to cooperate with plates 2 in affording the condenser effect, and as will be seen in Fig. II these plates 5 are approximately the shape and size of plates 2.

Means are provided for sustaining the plates 5 remote from the mica covered plates 2 and for bringing them progressively of their longitudinal extent into bearing upon the outer surfaces of the mica plates 3. Accordingly the block 1, carrying plates 2 with their mica coverings 3, is mounted in a frame which consists of end plates 6 and tension bolts 7. The block 1 is rigidly borne, centrally within this frame.

A shaft 8, axially borne by the frame, extends axially through block 1. It is rotatable in its mounting, and, that it may be manually rotated, it is provided with the milled head 9. The shaft 8 carries cylindrical blocks 10 of bakelite or of equivalent dielectric material, and these blocks are provided peripherally with spirally extending slots 11. At one end these slots extend through the cylindrical heads of the blocks, and form radially extending slots in the cylinder heads. These slotted heads of these cylindrical blocks are the heads which in the assembly are adjacent block 1. The blocks 10 are mounted at proper intervals from block 1 to receive into the space between them and block 1 the plates 5, and to press plates 5 firmly upon the mica sheets 3 which overlie the plates 2.

The plates 5 are anchored at their narrow ends in block 1, and from such anchorage they extend into the slots 11 of the blocks 10, which open to receive them, as I have said, through the heads of the cylindrical blocks 10.

As the blocks 10 borne by shaft 8 are turned within the frame and relatively to block 1, the plates 5, to greater or less extent of their length, are withdrawn from the slots 11 in blocks 10 and pressed by blocks 10 upon the mica sheets 3 which overlie plates 2. The plates 5 are so shaped that they overlie with substantial accuracy the plates 2.

The plates 5 are anchored at points 12 and 13 which are not in alignment, but which rather are somewhat remote, one from the other. At their anchorages electrical connection is made, and, circuits being established between these anchorages severally and the binding posts 4, and sources of electric energy being included in those circuits, the plates 2 and 5, to the extent that they extend in close engagement upon opposite sides of the mica plates 3, become condenser plates. And proportionately as the blocks 10 are turned, and the plates 5 brought to greater or less extent to such close engagement upon the mica plates, the efficacy of the condenser is increased or diminished.

Consideration of Fig. II will show that in the use of the instrument the companion condenser plates may be brought to opposition with the sheet of dielectric between over an area which increases from a single point of overlap, at a, to any desired degree, within the range of the particular instrument; and that by virtue of the tapered shape and the relative arrangement of the two strips the rate of increase of this area of opposition increases as the actual area of opposition increases. Thus finer adjustment becomes possible when actual values are less.

It will be perceived that there is essential relative movement between the block 1 and the two blocks 10, and that the strips 2 and 5 extend in the direction of such relative movement. It is then a matter of convenience that the blocks are cylindrical and the relative movement rotary.

I claim as my invention:

1. A variable electrical condenser including two blocks of insulating material arranged face to face and movable one relatively to the other, two strips of conducting material and a sheet of insulating material, the two strips of conducting material being anchored each at one end to one of said blocks, with the sheet of insulating material between them, and extending from such anchorage in the direction of relative movement between said blocks, the second block being slotted transversely of the direction of such relative movement, the outer of said strips extending when the parts are assembled from its anchorage through the slots in the second block, and means for making electrical connections with said strips severally at their anchored ends.

2. A variable electrical condenser including two blocks of insulating material arranged face to face and movable one relatively to the other, two strips of conducting material of which one is flexible and a sheet of insulating material, the two strips of conducting material being anchored each at one end to one of said blocks, with the sheet of insulating material between them and the flexible strip outermost, the strips extending from such anchorage in the direction of relative movement between said blocks, the second block being provided with a slot inclined to the meeting plane between the blocks, opening through the surface of engagement with the companion block and in extent equalling the flexible strip in length, the flexible strip when the parts are assembled extending from its anchorage into the slot in the slotted block, and means for making electrical connection with said strips severally.

3. In a variable electric condenser adapted for use in a radio receiving set two relatively stationary strips of conducting material faced with sheets of dielectric, two flexible strips of conducting material secured each at one end and there connected to separate binding posts and adapted progressively to overlie the strips first named, with the sheet of dielectric between, and a slotted carrier of insulating material movable relatively to the strips first named and receiving within their slots when the parts are assembled the otherwise free ends of the flexible strips, and a binding post for each of said relatively stationary strips.

4. In a variable condenser a block of insulation bearing a strip of conducting material faced with a sheet of dielectric, a second and flexible strip of conducting material anchored at one end to said block of insulation and adapted progressively to overlie the strip first named with the sheet of dielectric between, and a second block of insulation movable in face to face relation to the first, and provided with a slot opening through the companion-facing surface and extending through a length as great as the length of said flexible strip, the said flexible strip, when the parts are assembled extending at its otherwise free end within the slot in the relatively movable block, and means for making electrical contact with said strips severally at their anchored ends.

In testimony whereof I have hereunto set my hand.

CARL S. GERBER.